US008683432B2

(12) United States Patent
Talbert et al.

(10) Patent No.: US 8,683,432 B2
(45) Date of Patent: Mar. 25, 2014

(54) PROVIDING EXECUTION CONTEXT IN CONTINUATION BASED RUNTIMES

(75) Inventors: Nathan C. Talbert, Seattle, WA (US); Kenneth D. Wolf, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1012 days.

(21) Appl. No.: 12/408,088

(22) Filed: Mar. 20, 2009

(65) Prior Publication Data

US 2010/0242030 A1 Sep. 23, 2010

(51) Int. Cl.
*G06F 9/44* (2006.01)
*G06F 9/45* (2006.01)

(52) U.S. Cl.
USPC .................. 717/117; 717/107; 717/139

(58) Field of Classification Search
None
See application file for complete search history.

(56) References Cited

U.S. PATENT DOCUMENTS

| | | | |
|---|---|---|---|
| 5,628,017 A | 5/1997 | Kimmerly et al. | |
| 5,822,585 A | 10/1998 | Noble et al. | |
| 5,901,315 A | 5/1999 | Edwards et al. | |
| 5,903,891 A | 5/1999 | Chen et al. | |
| 6,009,405 A | 12/1999 | Leymann et al. | |
| 6,119,145 A | 9/2000 | Ikeda et al. | |
| 6,192,512 B1 | 2/2001 | Chess | |
| 6,202,207 B1 | 3/2001 | Donohue | |
| 6,408,434 B1 | 6/2002 | Fujiwara | |
| 6,654,954 B1 | 11/2003 | Hicks | |
| 6,721,809 B1 | 4/2004 | Roy et al. | |
| 6,810,523 B2 | 10/2004 | Segev et al. | |
| 7,003,782 B2 | 2/2006 | Baldwin et al. | |
| 7,076,784 B1 | 7/2006 | Russell et al. | |
| 7,305,672 B2 | 12/2007 | Vincent | |
| 7,328,242 B1 * | 2/2008 | McCarthy et al. | 709/204 |
| 7,565,640 B2 * | 7/2009 | Shukla et al. | 717/107 |
| 7,631,291 B2 * | 12/2009 | Shukla et al. | 717/117 |
| 7,716,278 B2 | 5/2010 | Beringer et al. | |
| 7,788,637 B2 * | 8/2010 | Hunt et al. | 717/107 |
| 7,805,325 B2 | 9/2010 | Rits et al. | |
| 7,805,327 B1 | 9/2010 | Schulz et al. | |
| 7,984,429 B2 * | 7/2011 | Hunt | 717/139 |
| 8,082,544 B2 | 12/2011 | Inchingolo et al. | |

(Continued)

OTHER PUBLICATIONS

Bruce Bukovics, "Pro WF: Windows Workflow in .NET 3.5", Apress, ISBN 978-1-4302-0975-1; Chapters 00-19; pp. 1-792 (total 20 pdf files attached).*

(Continued)

*Primary Examiner* — Thuy Dao
*Assistant Examiner* — Ben C Wang
(74) *Attorney, Agent, or Firm* — Brian Haslam; Tom Wong; Micky Minhas

(57) ABSTRACT

In an embodiment, a computer system instantiates a parent activity configured for execution in a continuation based runtime. The parent activity includes various child activities configured to perform pulses of work. The parent activity is also configured to add execution properties to an execution context. The computer system adds execution properties to the parent activity's execution context to generate a modified execution context which includes execution properties that extend the functionality of the parent and child activities. The added execution properties include corresponding identifiers that identify the added execution properties. The computer system also executes the parent activity including the various child activities within the modified execution context in the continuation based runtime. The modified execution context includes the added execution properties that are available to the parent and any child activities during execution, where at least one child activity implements functionality provided by the added execution properties.

27 Claims, 5 Drawing Sheets

(56) References Cited

U.S. PATENT DOCUMENTS

| | | | |
|---|---|---|---|
| 8,191,042 B2* | 5/2012 | Pinto et al. | 717/117 |
| 2002/0184616 A1 | 12/2002 | Chessell et al. | |
| 2004/0008678 A1 | 1/2004 | Matthews et al. | |
| 2005/0039186 A1* | 2/2005 | Borkan | 719/310 |
| 2005/0093881 A1 | 5/2005 | Okita et al. | |
| 2005/0097578 A1 | 5/2005 | Rangarajan | |
| 2005/0149868 A1 | 7/2005 | Katayama et al. | |
| 2005/0171930 A1 | 8/2005 | Arning et al. | |
| 2005/0262182 A1 | 11/2005 | Thole | |
| 2006/0074714 A1 | 4/2006 | Aziz et al. | |
| 2006/0074730 A1* | 4/2006 | Shukla et al. | 705/8 |
| 2006/0074736 A1 | 4/2006 | Shukla et al. | |
| 2006/0136279 A1 | 6/2006 | Maybee et al. | |
| 2006/0277024 A1 | 12/2006 | Kloppmann et al. | |
| 2007/0011334 A1 | 1/2007 | Higgins et al. | |
| 2007/0050227 A1 | 3/2007 | Teegan et al. | |
| 2007/0078947 A1 | 4/2007 | Lakhdhir | |
| 2007/0150509 A1 | 6/2007 | Lev et al. | |
| 2007/0156888 A1 | 7/2007 | Hilerio et al. | |
| 2007/0233969 A1 | 10/2007 | Shukla et al. | |
| 2007/0239505 A1 | 10/2007 | Shukla et al. | |
| 2008/0052725 A1 | 2/2008 | Stoodley et al. | |
| 2008/0208365 A1 | 8/2008 | Grgic | |
| 2008/0216066 A1 | 9/2008 | Oh | |
| 2008/0221917 A1 | 9/2008 | Boyette | |
| 2008/0301667 A1 | 12/2008 | Rao | |
| 2009/0064171 A1 | 3/2009 | Davis et al. | |
| 2009/0158283 A1* | 6/2009 | Pinto et al. | 718/102 |
| 2009/0260009 A1* | 10/2009 | Pinto et al. | 718/100 |
| 2009/0300648 A1* | 12/2009 | Box et al. | 719/313 |
| 2010/0153930 A1* | 6/2010 | Lambert et al. | 717/139 |
| 2010/0169862 A1* | 7/2010 | Wolf et al. | 717/117 |
| 2010/0293538 A1* | 11/2010 | Wolf et al. | 717/170 |
| 2012/0078677 A1* | 3/2012 | Green et al. | 705/7.26 |

OTHER PUBLICATIONS

Sade et al., "Optimizing C Multithreaded Memory Management Using Thread-Local Storage", 2005, Springer-Verlag Berlin Heidelberg, pp. 137-155; <link.springer.com/content/pdf/10.1007%2F978-3-540-31985-6_10>.*

Al-Gahmi et al., "Towards a Service-Based Middleware Layer for Runtime Environments", Mar. 2008, ACM, SAC'08 Mar. 16-20, 2008, Fortaleaz, Ceará, Brazil, pp. 507-511; <http://dl.acm.org/citation.cfm?id=1363686.1363810&coll=DL&dl=Guide&Cfid=227070258&Cftoken=54996734>.*

Martorell et al., "Techniques Supporting threadprivate in OpenMP", 2006 IEEE, pp. 1-7; <http://ieeexplore.ieee.org/stamp/stamp.jsp?tp=&arnumber=1639501>.*

U.S. Appl. No. 12/466,712, filed May 15, 2009, Wolf.

Hicks, et al.; "Practical Dynamic Software Updating fpr C"; Jun. 11-14, 2006; pp. 1-12; http://www.csumd.edu/~neamtiu/pubs/ginseng.pdf.

Previtali; "Dynamic Updates: Another Middleware Service?", Mar. 20, 2007; pp. 1-6, http://www.lst.inf.ethz.ch/research/publications/MAI_2007/MAI_2007.pdf.

Transactional Support for Inter-Task Co-Ordination within Long-Lived Distibuted Applications (6 pages), 1999, http://hpts.ws/papers/1999/Shrivastava.htm.

Introduction to Hosting Windows Workflow Foundation (9 pages) 2007, http://msdn2.microsoft.com/en-us/library/aa663362#hostingwwf_topic5.

Eder J. & Liebhart W. (Nov. 1994). A Transaction-Oriented Workflow Activity Model. Proceedings of the 9th International Symposium on Computer Information Systems (ISCIS IX) pp. 9-16. http://www.pri.univie.ac.at/Publications/1994/Eder_A_Transaction_Oriented_Workflow_Activity_Model.pdf.

Parameterized Modules in Erlang—2003 (7 pages) http://www.erlang.se/workshop/2003/paper/p29-carlsson.pdf.

Developing Mobile Applications with the Compact Framework 2.0—Jul. 17, 2007 (41 pages) http://blogs.msdn.com/trobbins/archive/2007/07/17/developing-mobile-applications-with-the-compact-framework-2-0.aspx.

Creating and Executing Callback Functions (4 pages) http://www.mathworks.com/help/imaq/creating-and-executing-callback-functions.html [retrieved on Nov. 20, 2012].

U.S. Appl. No. 12/466,712, May 25, 2012, Office Action.
U.S. Appl. No. 12/466,712, Nov. 8, 2012, Office Action.
U.S. Appl. No. 12/103,639, Aug. 8, 2011, Office Action.
U.S. Appl. No. 12/103,639, Dec. 15, 2011, Notice of Allowance.
U.S. Appl. No. 12/129,594, Mar. 28, 2012, Office Action.
U.S. Appl. No. 12/129,594, Jun. 11, 2012, Office Action.

* cited by examiner

PROVIDING EXECUTION CONTEXT IN CONTINUATION BASED RUNTIMES

BACKGROUND

One type of software is referred to as a "runtime". A runtime provides underlying functionality that can be used by multiple applications that run on a computing system. One distinct type of runtime is called a "continuation based runtime". A continuation based runtime executes activities. An activity represents a unit of executable code that consists of multiple pulses of work. For instance, suppose an activity is to receive messages. In that case, one pulse of work might be to set up the computing system with proper configuration and state to receive messages, and then pause until a message is received. Another pulse of work might occur when a message is received, which might involve setting up the message so that data can be extracted from the message. Another pulse of work might be to extract the data from the message itself, and so forth.

One of the ways an activity can execute multiple pulses of work is through the scheduling of child activities. This composition of activities enables custom control flows that can be implemented through the scheduling of child activities 0, 1 or n times as determined by the composite activity. Beyond this flexibility to create new control flows, activities in a continuation based runtime have a number of distinct characteristics. For instance, such activities have no process affinity in that they can be paused in one process, and resumed in a different process, and may also run on different threads. Such activities can also be persisted into persistent storage for later rehydration back into memory, along with any stored state information.

Continuation based runtimes are typically hosted in the context of an application running on a lower level runtime that executes code on physical or virtual threads. In such scenarios, thread-local storage (TLS) may be used to maintain an execution context for each thread. The execution context typically governs thread properties such as thread identity, the ambient transaction, the current permission set and user-defined thread properties such as named slots.

BRIEF SUMMARY

Embodiments described herein are directed to providing execution properties in an activity's execution context in a continuation based runtime. In one embodiment, a computer system instantiates a parent activity configured for execution in a continuation based runtime. The parent activity includes various child activities configured to perform pulses of work. The parent activity is also configured to add execution properties to an execution context, where the execution context includes those execution properties that are available to the parent and child activities during execution. The computer system adds execution properties to the parent activity's execution context to generate a modified execution context which includes execution properties that extend the functionality of the parent and child activities, where the parent and child activities are configured to use the added execution properties during execution. The added execution properties include corresponding identifiers that identify the added execution properties. The computer system also executes the parent activity including the various child activities within the modified execution context in the continuation based runtime. The modified execution context includes the added execution properties that are available to the parent and any child activities during execution.

Other embodiments are directed to bridging the execution of a subtree of activities in a continuation based runtime with the context model of the underlying runtime. In one embodiment, an execution property implements a thread-local store (TLS) interface, where the interface is configured to provide a mechanism for initiating TLS setup and cleanup for a subtree of activities. The setup and cleanup are functions usable during the execution of the subtree of activities by a continuation based runtime. A computer system registers the TLS interface with the continuation based runtime, such that the TLS interface is usable when executing the subtree of activities. Prior to executing a pulse of work associated with the at least one of the activities, the continuation based runtime calls the setup function of the TLS interface for each execution property of the activity that is to be executed. The execution property modifies the TLS to access various objects dependant on TLS with the continuation based runtime. The activity accesses the TLS-dependant objects using the TLS interface and, after execution of the pulse of work, the continuation based runtime calls the cleanup function of the TLS interface to undo the modifications made to the TLS by the setup function.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
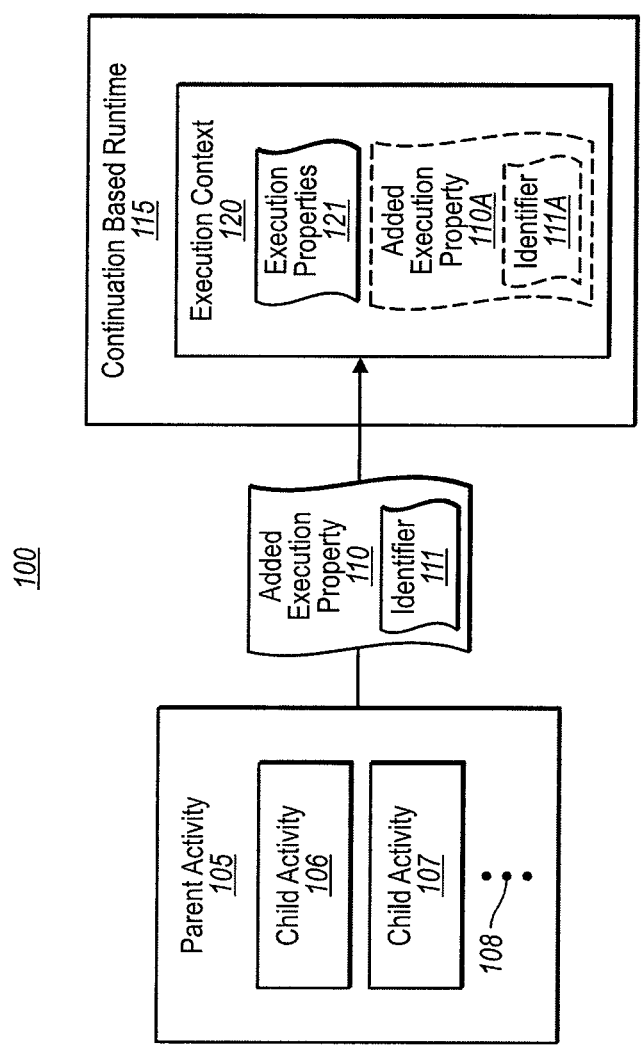
FIG. 1 illustrates a computer architecture in which embodiments of the present invention may operate including providing execution properties in an activity's execution context in a continuation based runtime.

Embodiments described herein are directed to providing execution properties in an activity's execution context in a continuation based runtime. In one embodiment, a computer system instantiates a parent activity configured for execution in a continuation based runtime. The parent activity includes various child activities configured to perform pulses of work. The parent activity is also configured to add execution properties to an execution context, where the execution context includes those execution properties that are available to the parent and child activities during execution. The computer system adds execution properties to the parent activity's execution context to generate a modified execution context which includes execution properties that extend the functionality of the parent and child activities, where the parent and child activities are configured to use the added execution properties during execution. The added execution properties include corresponding identifiers that identify the added execution properties. The computer system also executes the parent activity including the various child activities within the modified execution context in the continuation based runtime. The modified execution context includes the added execution properties that are available to the parent and any child activities during execution.

Other embodiments are directed to bridging the execution of a subtree of activities in a continuation based runtime with the context model of the underlying runtime. In one embodiment, an execution property implements a thread-local store (TLS) interface, where the interface is configured to provide a mechanism for initiating TLS setup and cleanup for a subtree of activities. The setup and cleanup are functions usable as part of the execution process during the execution of the subtree of activities by a continuation based runtime. A computer system registers the TLS interface with the continuation based runtime, such that the TLS interface is usable when executing the subtree of activities. Prior to executing a pulse of work associated with the at least one of the activities, the continuation based runtime calls a setup function of the TLS interface, if one exists, for each execution property available to the activity that is to be executed. The execution property modifies the TLS to access various objects dependant on TLS with the continuation based runtime. The activity accesses the TLS-dependant objects using the TLS interface and, after execution of the pulse of work, the continuation based runtime calls the cleanup function of the TLS interface to undo the modifications made to the TLS by the setup function.

Embodiments of the present invention may comprise or utilize a special purpose or general-purpose computer including computer hardware, as discussed in greater detail below. Embodiments within the scope of the present invention also include physical and other computer-readable storage media for carrying or storing computer-executable instructions and/or data structures. Such computer-readable media can be any available media that can be accessed by a general purpose or special purpose computer system. Computer-readable media that store computer-executable instructions are physical storage media including recordable-type storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry or transport desired program code means in the form of computer-executable instructions or data structures and which can be accessed by a general purpose or special purpose computer. Combinations of the above should also be included within the scope of computer-readable media.

However, it should be understood, that upon reaching various computer system components, program code means in the form of computer-executable instructions or data structures can be transferred automatically from transmission media to physical storage media. For example, computer-executable instructions or data structures received over a network or data link can be buffered in RAM within a network interface card, and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates a computer architecture 100 in which the principles of the present invention may be employed. Computer architecture 100 includes various activities configured to run in a continuation based runtime (CBR). Parent activities may include multiple child activities which are configured to run zero, one or more times as part of the parent activity. For example, parent activity 105 may include child activities 106 and 107. Ellipses 108 indicate that many more child activities may also be included. Moreover, it should be understood that parent activity 105 may be executed by itself without any child activities.

As explained above, activities may be executed to accomplish a certain function or set of functions. For instance, child activities 106 and 107 may be configured to perform pulses of work as determined by a control flow. A control flow may designate how each pulse of work is to be processed, including the order in which the pulses are to be processed. As illustrated in FIG. 1, activities 105-108 may be sent to continuation based runtime 115 for execution. The activities are then executed within a context (e.g. execution context 120). Execution context 120 may include various properties which are used during execution of the activities. For example, any of the activities 105-108 may use these properties during execution. In some cases, the activities may use these properties even though the activities were not specifically written to use the properties. The activity or pulse of work may learn of an execution property in the execution context and, because that property is available and desirable to use during execution, the activity or pulse of work may incorporate that execution property in its execution.

In some cases, one or more execution properties 121 may already be included as part execution context 120. In other cases, execution properties 110 may be added to the existing execution properties 121 as added execution property 110A. In order for the activities to properly implement the added execution properties, each execution property (or set thereof) may be identified by identifier 111. This identifier may be any type of information that could identify an execution property including a string, a GUID, a type identifier, an integer, a user-assigned name or other identifier. Such an identifier 111 may be added along with added execution property 110A as identifier 111A. These concepts will be explained in greater detail below with regard to method 200 of FIG. 2.

Figure 2:
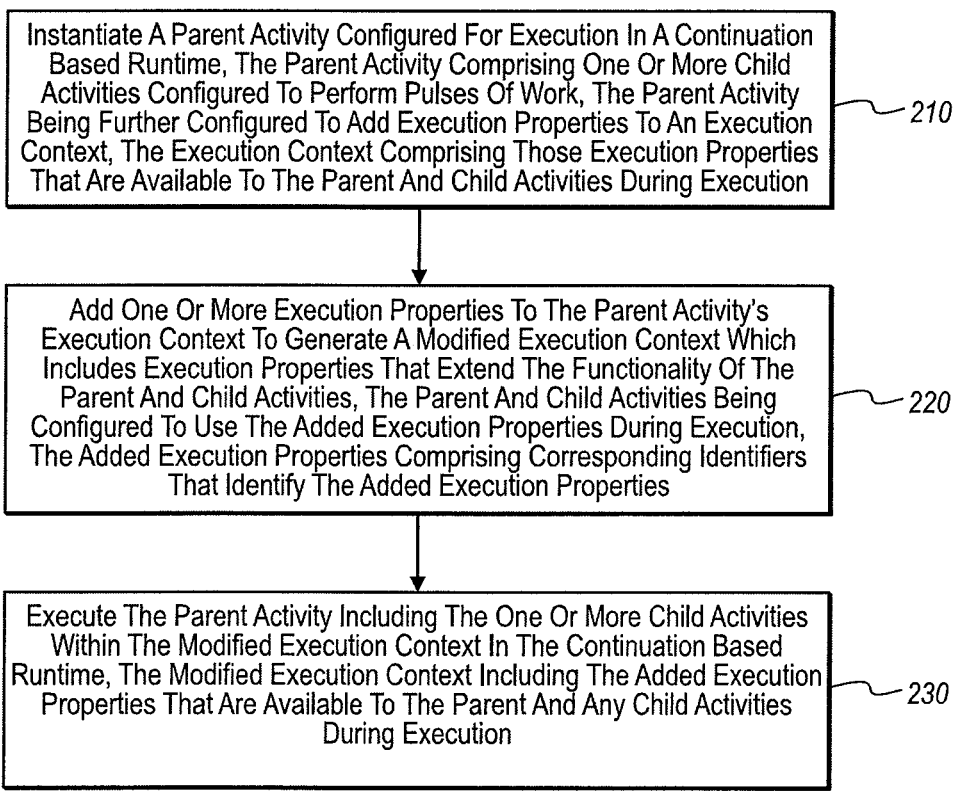
FIG. 2 illustrates a flowchart of an example method for providing execution properties in an activity's execution context in a continuation based runtime.

FIG. 2 illustrates a flowchart of a method 200 for providing execution properties in an activity's execution context in a continuation based runtime. The method 200 will now be described with frequent reference to the components and data of environment 100.

Method 200 includes an act of instantiating a parent activity configured for execution in a continuation based runtime, the parent activity comprising one or more child activities configured to perform pulses of work, the parent activity being further configured to add execution properties to an execution context, the execution context comprising those execution properties that are available to the parent and child activities during execution (act 210). For example, parent activity 105 may be instantiated by a computer system, where the parent activity is configured for execution in CBR 115. As indicated above, parent activity 105 may include various child activities 106-108 configured to perform pulses of work. Pulses of work are individual portions of software functionality that can be executed independently as part of an overall process. Each pulse of work may be designed to perform a specific function, and may be configured to work with, or as a part of, other pulses of work in other child activities.

In some embodiments, parent activity 105 may be configured to add execution properties 110 to execution context 120. As mentioned above, execution context 120 includes those execution properties that are available to parent and child activities 105-108 during execution by the CBR. Parent activity 105 may be configured to add the execution properties either before execution of the activities has begun or during execution of the activities. Accordingly, execution context 120 may be updated dynamically during execution. As such, child activities may use the added execution properties during or as part of their execution.

Method 200 also includes an act of adding one or more execution properties to the parent activity's execution context to generate a modified execution context which includes execution properties that extend the functionality of the parent and child activities, the parent and child activities being configured to use the added execution properties during execution, the added execution properties comprising corresponding identifiers that identify the added execution properties (act 220). For example, execution property 110 may be added to parent activity 105's execution context to generate a modified execution context which includes added execution properties 110A that extend the functionality of activities 105-108. These activities are configured to use the added execution properties during execution. The activities identify the newly added properties using the property's associated identifiers 111A.

In some embodiments, finding or identifying the newly added execution properties may include searching within the parent activity's execution context for an execution property using a generic identifier. For instance, the generic identifier may include a generic user-defined name such as "color" for color-related properties or "web" for web- or internet-related properties. In should be understood that any name or identifier may be applied to a given property or set of properties and that any given execution property may have or be associated with multiple different names. For instance, as in the above example, a given execution property may be applicable for color- and web-related functions, and thus may be returned in a search made using either name. In some cases, identifiers 111 may be added at different activity scopes. As a result, an execution property may be available to one activity and not to another. Moreover, each user-applied identifier may be unique for each activity.

Figures 4A, 4B:
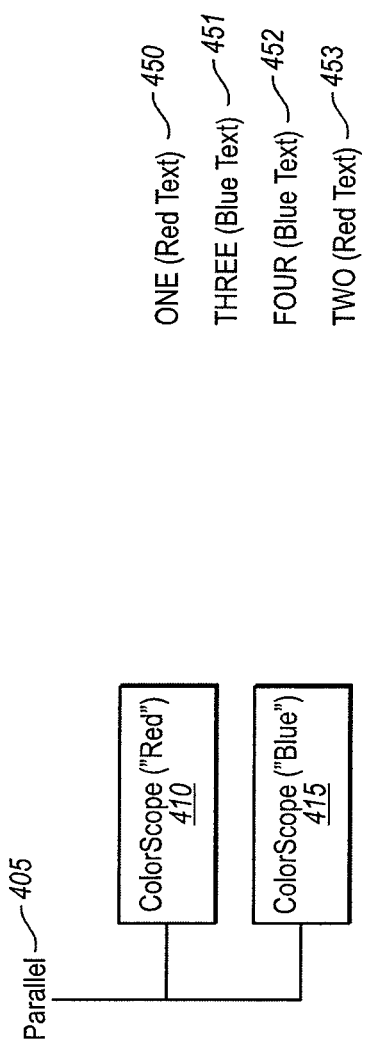
FIG. 4A illustrates a parallel activity configured for operation in embodiments of the present invention.
FIG. 4B illustrates various portions of text that may be outputted as a result of operation of an embodiment of the present invention.

For example, as illustrated in FIG. 4A, a parent activity named "Parallel" (405) has two parallel child activities, each including the "ColorScope" function. ColorScope ("Red") 410 includes the identifier "Red." ColorScope ("Blue") 415 includes the identifier ("Blue"). These functions may thus be identified using the associated identifiers. Accordingly, a simple program that is configured to output ONE and TWO in red text, and THREE and FOUR in blue text, may be processed in the CBR using different execution threads as they become available. Accordingly, the text numbers may not be displayed as ONE, TWO, THREE, FOUR, but may be displayed as they are processed by the CBR 115. Accordingly, when executed using the execution properties identified by each function's identifier, the text is outputted in the color identified by the generic name identifier included in the child activity. As a result, processing the child activities as each execution thread becomes available may result in ONE being output in red text 450, THREE in blue text 451, FOUR in blue text 452, and TWO in red text 453 in the order shown in FIG. 4B.

In other cases, an activity may add multiple different execution properties with the same identifier at different activity scopes. In such cases, when a child activity performs a search for an execution property, the execution property with the nearest activity scope to the activity performing the search may be selected. The execution property with the nearest activity scope is the execution property that is the least number of hops away on a corresponding ancestor chain from the activity performing the search (the ancestors being determined as part of an activity's parent/child relationship to other activities). In some cases, the ancestor chain is terminated at its terminus in a subtree of activity scopes. This subtree of activity scopes may be different than the activity scope of the parent activity and, accordingly, may result in a different terminus for the ancestor chain and for the parent activity.

Furthermore, any added execution properties added at any local activity scope are capable of being found in a name-based search. It should be noted that, at least in some cases, parent activities may act as boundary activities, where at least some of the properties are blocked or are otherwise not available across the boundaries formed by the boundary activities. Execution properties 110 may be stored in the same execution environment where argument and variable data is stored and accessed by the continuation based runtime. Thus, the execution properties may be readily accessible and may be accessed simultaneously and in conjunction with accessing other arguments or variable data.

In some embodiments, it may be determined that an activity will not be executed for a certain, threshold amount of time. In such cases, the execution properties may be stored or persisted in a store along with the current execution state associated with the activity. Upon determining at a later time that the activity is to be executed, the activity may access the persisted execution properties and use the persisted execution properties during execution of the activity. The activity may thus be executed at any time and on any thread (including being executed on a thread different than that on which the other pulses of work were processed). Thus, an activity or pulse of work may be persisted and rehydrated at a later time and executed with the stored (added) execution properties.

A registration scheme for properties may be implemented in some embodiments that allows other additional execution properties to be registered and implemented during addition of a property. For example, in one instance, a property may be added to execution context 120, where the added property implements an interface called "Interface_Name". The execution context may then call a method "Interface_Name.Register( )" for the property while the property is being added. The "Interface_Name.Register( )" method, when accessed by the execution context, may result in any one or more of the following: further modification of the execution context (e.g. adding or removing properties), validation of the execution context (e.g. ensuring that no conflicting properties already exist), and inspection of the execution context (e.g. creating a linked list or other similar data structure to represent a chain of execution properties).

Returning to FIG. 2, method 200 includes an act of executing the parent activity including the one or more child activities within the modified execution context in the continuation based runtime, the modified execution context including the added execution properties that are available to the parent and any child activities during execution (act 230). For example, CBR 115 may execute parent activity 105 including one or more of child activities 106 and 107 within the modified execution context 120. The modified execution context, as outlined above, includes the added execution properties 110A that are available to the parent and child activities during execution. In some cases, at least one of child activities 106 and 107 implements functionality provided by added execution properties 110A. After the parent activity and the child activities have been executed, any added execution properties may be removed automatically by the continuation based runtime or by the activity that added the properties.

In an embodiment, two activities may be configured for simultaneous execution. In such cases, CBR 115 may be configured to interleave activity processing while assigning execution properties to ensure that each activity's execution context is appropriate. That is, each activity processing on a given execution thread may be delayed, if necessary, until certain execution properties are available for that activity's execution context. In other embodiments, added execution properties 110A may implement an interface that allows the parent activity to implement thread local storage setup and cleanup during execution of the parent activity. This concept will be explained in greater detail below with regard to method 300 of FIG. 3.

Figure 3:
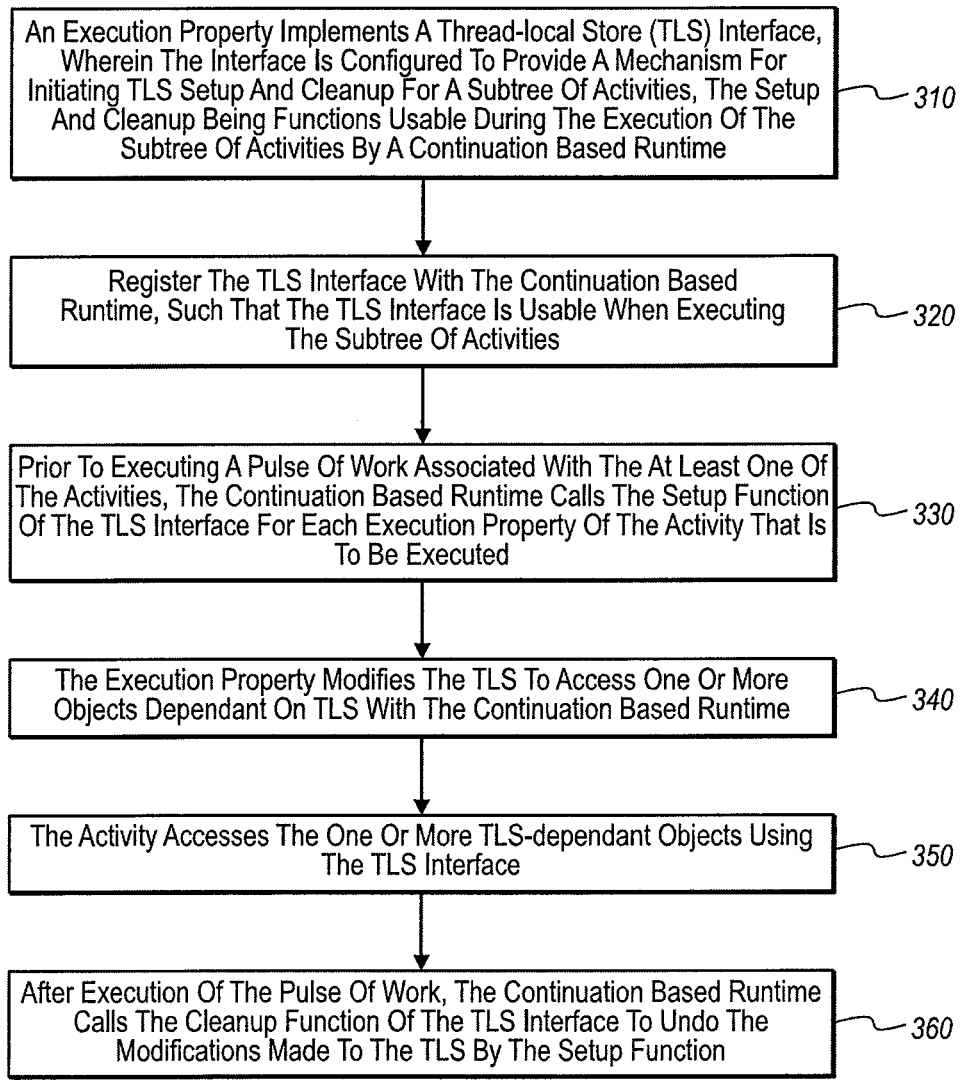
FIG. 3 illustrates a flowchart of an example method for bridging the execution of a subtree of activities in a continuation based runtime with the context model of the underlying runtime.
Figure 5:
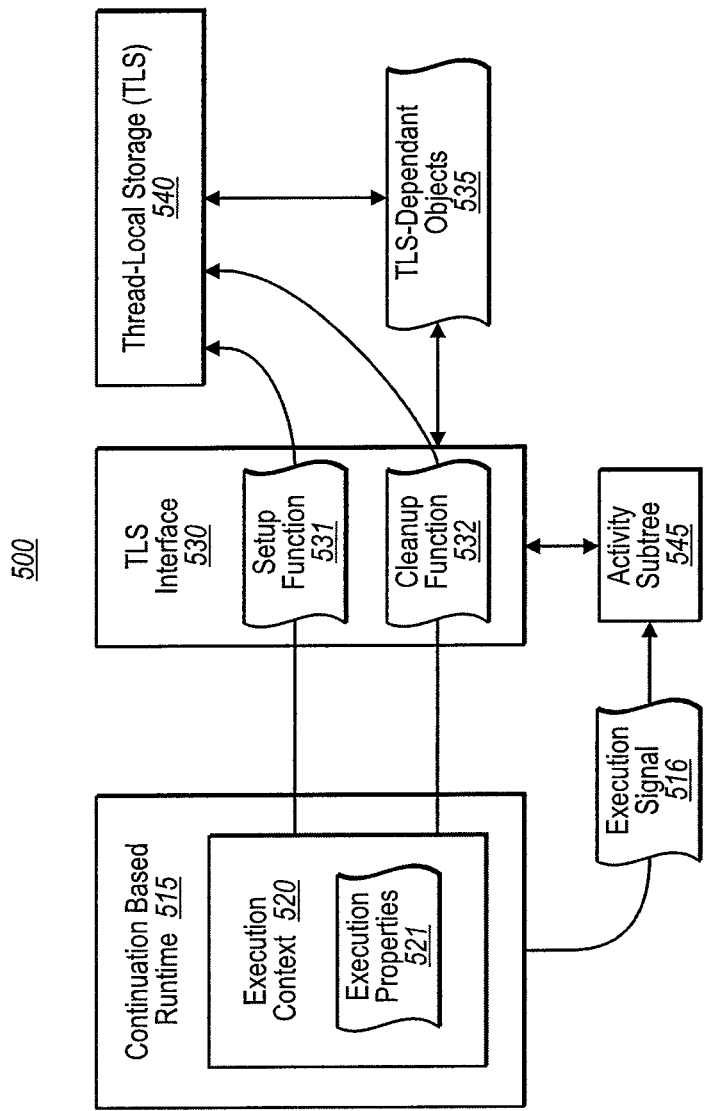
FIG. 5 illustrates an alternate computing system environment in which embodiments of the present invention may operate.

FIG. 3 illustrates a flowchart of a method 300 for bridging the execution of a subtree of activities in a continuation based runtime with the context model of the underlying runtime. The method 300 will now be described with frequent reference to the components and data of environment 500 of FIG. 5.

Method 300 includes an act of an execution property implementing a thread-local store (TLS) interface, wherein the interface is configured to provide a mechanism for initiating TLS setup and cleanup for a subtree of activities, the setup and cleanup being functions usable during the execution of the subtree of activities by a continuation based runtime (act 310). For example, execution property 521 may implement TLS interface 530 which is configured to provide a mechanism for initiating TLS setup and cleanup for a subtree of activities 545, where setup function 531 and cleanup function 532 are usable during execution of the subtree of activities by CBR 515. As explained above, thread-local storage or TLS is used to maintain an execution context for each thread. Among other things, this execution context may provide context (e.g. properties and state) for activities being processed on a given thread. TLS interface 530, as will be explained below, may be used to allow the use of TLS-dependent objects 535 in a continuation based runtime.

Method 300 includes an act of registering the TLS interface with the continuation based runtime, such that the TLS interface is usable when executing the subtree of activities (act 320). For example, TLS interface 530 may register with CBR 515 so that the TLS interface is usable when executing activity subtree 545. Registering allows the TLS and the CBR to exchange information in preparation for processing various activities.

Method 300 includes, prior to executing a pulse of work associated with the at least one of the activities, an act of the continuation based runtime calling the setup function of the TLS interface for each execution property of the activity that is to be executed (act 330). For example, before executing various pulses of work associated with one or more activities (as triggered by execution signal 516), CBR 515 may call setup function 531 of TLS interface 530 to set up or configure each execution property of the activities that are to be executed. This setup function prepares the activity's execution context 520 and execution properties 521 for use with TLS 540 and TLS-dependent objects 535. Setup function 531 may be configured to provide proper context for a given parent or child activity, even if that activity is being processed out of order or is being processed on a different physical or virtual thread than the other related activities. As such, TLS, which is designed to work for activities on a given thread, can be configured to process and work with activities being processed asynchronously and in a thread- and process-agnostic manner.

Method 300 further includes an act of the execution property modifying the TLS to access one or more objects dependant on TLS with the continuation based runtime (act 340). For example, execution property 521 may modify TLS 540 to access TLS-dependent objects 535 with CBR 515. As such, TLS-dependent objects 535 may be accessed by the CBR using TLS interface 530, as the interface provides setup and cleanup functions that provide execution properties for each activity that is being processed.

Method 300 includes an act of the activity accessing the one or more TLS-dependant objects using the TLS interface (act 350). For example, the activity that is to be processed (or is being processed) may access TLS-dependent objects 535 using TLS interface 530, as explained above.

Method 300 also includes, after execution of the pulse of work, an act of the continuation based runtime calling the cleanup function of the TLS interface to undo the modifications made to the TLS by the setup function (act 360). For example, after execution of the activity or a particular pulse of work, CBR 515 may call cleanup function 532 in TLS interface 530 to undo the modifications made to the TLS by setup function 531. Thus, upon undoing the modifications to the TLS, the TLS can operate using its normal functionality. In some cases, CBR 515 may automatically set up and clean up once for a plurality of pulses of work upon determining that each of the plurality of pulses of work is going to be on processed on the same physical thread. It should be noted that while a continuation based runtime has been described above, a message based or other runtime may be used in place of the CBR, and message or other properties may be used in place of execution properties.

Thus, in one example, the TLS interface may indicate to the CBR that when the CBR is about to schedule work on a physical thread, that the TLS interface is to be notified so that the TLS can be setup/modified for execution of the subtree. In this manner, TLS-dependent objects 535 can be used during execution of the activity subtree if needed. Moreover, the TLS interface can indicate to the CBR that when the CBR has finished processing the subtree of activities, the TLS interface is to be notified so it can clean up (i.e. undo) the modifications to the TLS. Thus, when a property has been registered and when the CBR is executing activities, setup and cleanup may occur for each pulse of work. This allows developers to use TLS in lower level implementations, but model the TLS using the benefits of a CBR.

Accordingly, a TLS may be bridged to work with a continuation based runtime using a TLS interface. Moreover, an activity's execution context may be modified before or during execution to include new execution properties which may be used during the execution of the activity.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A computer-implemented method for controlling a computer system by providing execution properties in an activity's execution context in a continuation based runtime, the computer-implemented method comprising:
    an act of instantiating a parent activity configured for execution in a continuation based runtime, the parent activity comprising one or more child activities configured to perform pulses of work, the parent activity being further configured to add execution properties to an execution context, the execution context comprising those execution properties that are available to the parent and child activities during execution;
    an act of adding one or more execution properties to the parent activity's execution context to generate a modified execution context which includes execution properties that extend the functionality of the parent and child activities, the parent and child activities being configured to use the added execution properties during execution, the added execution properties comprising corresponding identifiers that identify the added execution properties;
    an act of executing the parent activity including the one or more child activities within the modified execution context in the continuation based runtime, the modified execution context including the added execution properties that are available to the parent and any child activities during execution; and
    for the added one or more execution properties implementing an interface that
        (i) provides execution of a subtree of activities, and
        (ii) allows the parent activity to implement thread local storage setup and cleanup during execution of the subtree of activities.

2. The method of claim 1, further comprising an act of searching within the parent activity's execution context for an execution property using a generic identifier.

3. The method of claim 2, wherein the parent activity uses a name-based lookup to find an appropriate execution property.

4. The method of claim 2, wherein multiple different execution properties with the same identifier have been added at different activity scopes.

5. The method of claim 4, further comprising an act of selecting the execution property with the nearest activity scope to the activity performing the search, the execution property with the nearest activity scope comprising the execution property that is the least number of hops away on a corresponding ancestor chain from the activity performing the search.

6. The method of claim 5, wherein the ancestor chain's terminus is located in a subtree of activity scopes different than the activity scope of the parent activity.

7. The method of claim 1, wherein any added execution properties are removed automatically by the continuation based runtime after the parent activity and the child activities have been executed.

8. The method of claim 1, wherein the execution properties are stored in the same execution environment where argument and variable data is stored and accessed by the continuation based runtime.

9. The method of claim 8, further comprising:
    an act of determining that, because the activity will not be executed for at least a threshold amount of time, one or more execution properties are to be stored;
    an act of persisting one or more execution properties in a store along with the current execution state, the execution properties being configured for use with an activity that has not been executed;
    an act of determining that the activity is to be executed; and
    an act of accessing the persisted execution properties, such that the persisted execution properties can be used during execution of the activity.

10. The method of claim 1, wherein two activities are configured to be executed simultaneously.

11. The method of claim 10, wherein the continuation based runtime is configured to interleave activity processing while assigning execution properties to ensure that each activity's execution context is appropriate.

12. The method of claim 1, further comprising an act of implementing a property register scheme that allows other additional execution properties to be registered and implemented during addition of an execution property.

13. The method of claim 12, wherein at least one of the execution properties comprises a linked list representing multiple execution properties that are chained together for implementation during execution of the activity.

14. The method of claim 12, wherein any added execution properties at any activity scope are capable of being found in a name-based search.

15. The method of claim 1, further comprising removing the added execution properties from the parent activity's execution context.

16. The method of claim 1, further comprising:
an act of registering the interface with the continuation based runtime, such that the interface is usable when executing the subtree of activities; and
an act of the parent activity accessing one or more time-local storage dependent objects using the interface.

17. A computer program product for implementing within a computer system a method for bridging the execution of a subtree of activities in a continuation based runtime with the context model of the underlying runtime, the computer program product comprising one or more physical storage devices having stored thereon computer-executable instructions that, when executed by one or more processors of the computing system, cause the computing system to perform the method, the method comprising:
an act of an execution property implementing a thread-local store (TLS) interface, wherein the interface is configured to provide a mechanism for initiating TLS setup and cleanup for a subtree of activities, the setup and cleanup being functions usable during the execution of the subtree of activities by a continuation based runtime;
an act of registering the TLS interface with the continuation based runtime, such that the TLS interface is usable when executing the subtree of activities;
prior to executing a pulse of work associated with the at least one of the activities, an act of the continuation based runtime calling the setup function of the TLS interface for each execution property of the activity that is to be executed;
an act of the execution property modifying the TLS to access one or more objects dependant on TLS with the continuation based runtime; and
an act of the activity accessing the one or more TLS-dependant objects using the TLS interface;
after execution of the pulse of work, an act of the continuation based runtime calling the cleanup function of the TLS interface to undo the modifications made to the TLS by the setup function.

18. The computer program product of claim 17, further comprising an act of automatically setting up and cleaning up once for a plurality of pulses of work upon determining that each of the plurality of pulses of work is going to be processed using the same context in the underlying runtime.

19. The computer program product of claim 17, wherein a message-based runtime is used in place of the continuation based runtime.

20. One or more physical storage devices having stored thereon computer-executable instructions that, when executed by one or more processors of a computer system cause the computer system to implement a method for providing execution properties in an activity's execution context in a continuation base runtime, and wherein the method that is executed is comprised of:

an act of instantiating a parent activity configured for execution in a continuation based runtime, the parent activity comprising one or more child activities configured to perform pulses of work, the parent activity being further configured to add execution properties to an execution context, the execution context comprising those execution properties that are available to the parent and child activities during execution;
an act of adding one or more execution properties to the parent activity's execution context to generate a modified execution context which includes execution properties that extend the functionality of the parent and child activities during runtime, the parent and child activities being configured to use the added execution properties during execution, the added execution properties comprising corresponding identifiers that identify the added execution properties;
an act of executing the parent activity including the one or more child activities within the modified execution context in the continuation based runtime, the modified execution context including the added execution properties that are available to the parent and any child activities during execution, wherein at least one child activity implements functionality provided by the added execution properties; and
the added one or more execution properties implementing an interface that
(i) provides execution of a subtree of activities, and
(ii) allows the parent activity to implement thread local storage setup and cleanup during execution of the subtree of activities.

21. The one or more physical storage devices as recited in claim 20, wherein the corresponding identifiers includes a plurality of different identifiers, wherein each of the plurality of different identifiers corresponds to a different scope of activity.

22. The one or more physical storage devices as recited in claim 20, wherein the corresponding identifiers includes at least one identifier that is associated with a plurality of different activity scopes.

23. The one or more physical storage devices as recited in claim 20, wherein the corresponding identifiers including at least one string.

24. he one or more physical storage devices as recited in claim 20, wherein the corresponding identifiers including at least one globally unique identifier (GUID).

25. The one or more physical storage devices as recited in claim 20, wherein the corresponding identifiers including at least one type identifier.

26. The one or more physical storage devices as recited in claim 20, wherein the corresponding identifiers including at least one integer.

27. The one or more physical storage devices as recited in claim 20, wherein the corresponding identifiers including at least one user-identified name.

* * * * *